United States Patent [19]

Bray

[11] 3,939,074
[45] Feb. 17, 1976

[54] APPARATUS FOR CONTROL OF A REVERSE OSMOSIS SYSTEM

[75] Inventor: Donald T. Bray, Escondido, Calif.

[73] Assignee: Desalination Systems, Inc., Escondido, Calif.

[22] Filed: June 28, 1974

[21] Appl. No.: 484,120

[52] U.S. Cl. .......................... 210/257 M; 210/433 M
[51] Int. Cl.² .................... B01D 33/00; B01D 13/00
[58] Field of Search ............ 210/99, 100, 110, 116, 210/321, 257, 258, 433

[56] References Cited
UNITED STATES PATENTS 3,679,055 7/1972 Clark et al. ..................... 210/257 X
3,831,757 8/1974 Gossett et al. .................. 210/321 X Primary Examiner—Frank A. Spear, Jr.
Attorney, Agent, or Firm—Clement H. Allen

[57] ABSTRACT

A reverse osmosis system having a tank for storing purified water includes a valve in the pipe which introduces feed water into a module containing a semipermeable membrane and which produces the purified water. The valve shuts off or turns on introduction of feed water into the module in response to the weight of purified water in the storage tank.

2 Claims, 3 Drawing Figures

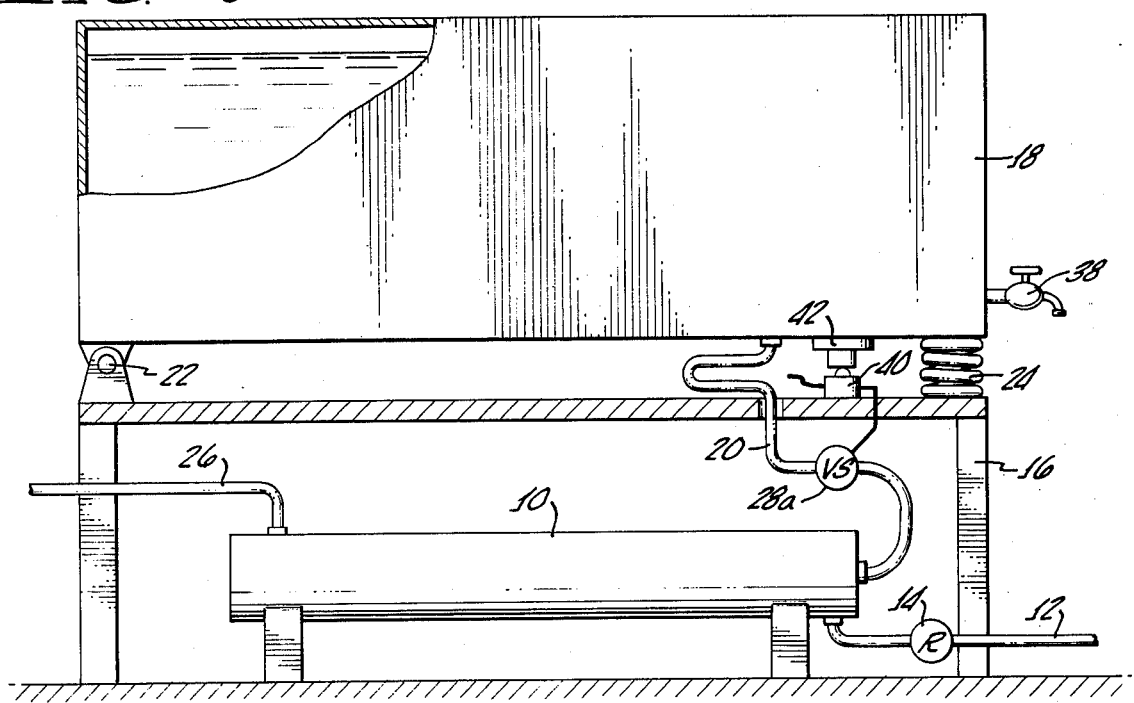

APPARATUS FOR CONTROL OF A REVERSE OSMOSIS SYSTEM

BACKGROUND OF THE INVENTION

1. The Field of the Invention

This invention relates to a reverse osmosis system, and particularly to such a system having operation control responsive to the amount of purified water in a purified water storage tank.

2. The Prior Art

A number of reverse osmosis systems particularly suited for home use have been proposed by the prior art for storing purified water produced by a module containing a semipermeable membrane. Various arrangements are described in U.S. Pat. Nos. 3,493,496; 3,746,640; 3,794,172 and 3,794,173. Such systems have employed various methods of controlling operation to provide release of purified water from the storage tank when an excess is produced (often determined by pressure), or simply rely on back pressure build-up in a closed purified water tank to slow down osmotic action and purified water production when the tank is full. Release of excess purified water by overflow is wasteful since the membrane module continues to operate, and the purified water, as well as brine or concentrate, is allowed to flow to drain. Control by allowing pressure build-up of the purified water in the storage tank is not very precise since purified water may continue to flow into the storage tank until shut off pressure is reached, and overflow must often also be provided.

This invention solves the problem of purified water storage tank control in a reverse osmosis system by automatically turning off or on the feed water supply to the membrane module, which correspondingly controls its purified water output, or the purified water supply to the storage tank, to maintain a predetermined amount of purified water in This invention solves the problem of purified water storage tank control in a reverse osmosis system by automatically turning off or on the feed water supply to the storage tank. This invention does not employ a float valve or other mechanical contrivance inside the purified water storage tank which might be subject to mechanical failure or might corrode and impart an undesirable taste to the contained water.

SUMMARY OF THE INVENTION

The reverse osmosis system of this invention comprises a module containing a semipermeable membrane, a pipe for introducing feed water under elevated pressure into the module, means which may include a restrictor or pressure control valve for releasing brine from the module while retaining operating pressure therein, and a tank for temporarily storing purified water passed through the semipermeable membrane in the module.

A valve is provided in one of the pipe introducing feed water into the module and the pipe transferring purified water from the module to the storage tank, this valve being actuated by means outside the tank for shutting off or turning on introduction of feed water into the module, and thus indirectly transfer of purified water into the storage tank, in response to the amount of purified water in the storage tank. Or, when this valve is provided in the pipe transferring purified water from the module to the storage tank, the shutting off or turning on of purified water transfer into the storage tank is, of course, direct.

The weight of water in the storage tank is employed for determining the amount, to automatically control actuation of the feed water input valve, or the purified water transfer valve, to maintain a predetermined amount of purified water in the storage tank. Hydraulic head is commonly considered to be a column height producing a pressure or weight of a liquid exerted over a unit area.

The means for actuating the feed water introduction or purified water transfer valve are disposed outside the purified water storage tank.

BRIEF DESCRIPTION OF THE DRAWINGS

In the drawings:

FIG. 3 is a diagrammatic illustration of a modified form of the system of FIG. 2, in which an electrically controlled valve is employed in the pipe transferring purified water from the module to the storage tank.

DESCRIPTION OF PREFERRED EMBODIMENTS

Figure 1:
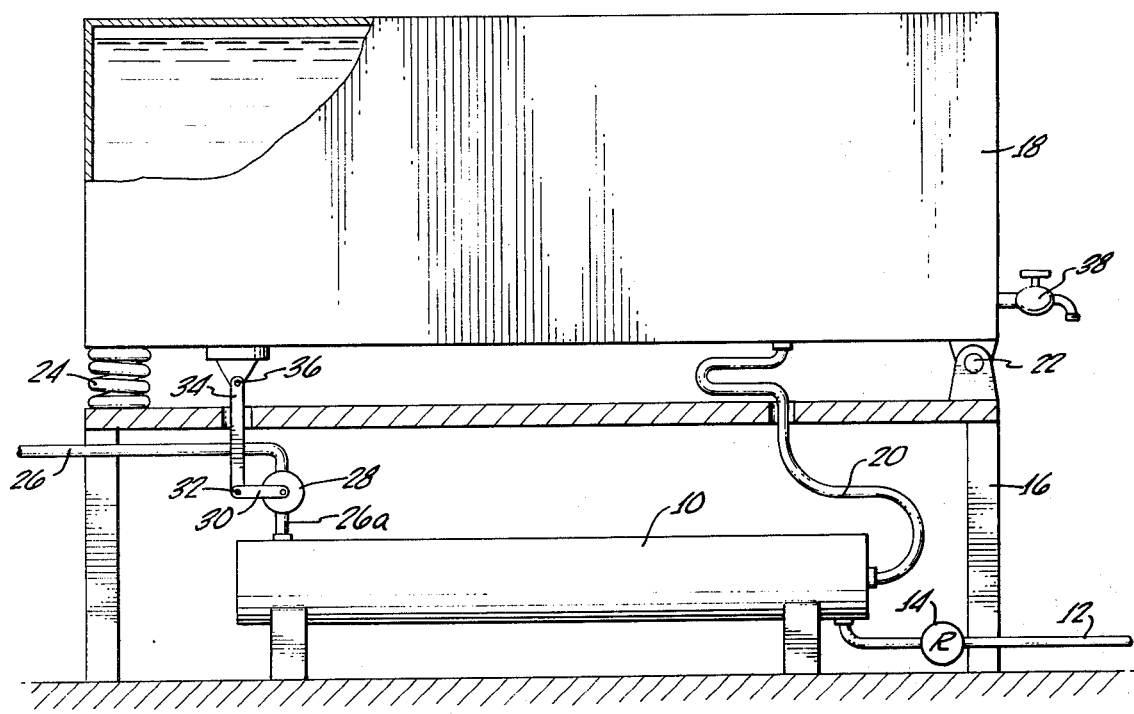
FIG. 1 is a diagrammatic illustration of a reverse osmosis system embodying features of the invention.

Referring now to FIG. 1, the reverse osmosis system comprises a reverse osmosis module 10, which contains a semipermeable membrane. Such modules are well known in the art and are described in detail, for example, in U.S. Pat. Nos. 3,493,496; 3,504,796; 3,542,199; and 3,542,203. An advantageous design includes a so-called spiral wound membrane cartridge. The brine or concentrate is released from module 10 through pipe 12, its release being controlled by an internal restrictor inside module 10, or an external pressure control valve, or as shown, restrictor 14, which in addition maintains operating pressure of liquid in module 10.

Rack 16 is arranged to support a storage tank 18 for temporarily holding purified water which has been passed through the semipermeable membrane in module 10 and from which it is transferred from module 10 through, preferably flexible, pipe or tubing 20. Storage tank 18 which as will be clearly seen in the drawings is of rigid construction, is pivotably mounted on rack 16, one end being supported by pivot or hinge 22 and the other by a resilient support such as spring 24. Feed water under elevated pressure from a source not shown and which it is required to purify, is introduced into module 10 through pipe 26, in which is placed a valve 28, which shuts off or turns on the flow of feed water through pipe 26 responsive to the weight of purified water temporarily stored in storage tank 18. Valve 28 is of any suitable type such as a so-called plug valve or a ball valve, and communicates with pipe 26 at one end or side and to module 10 by pipe 26a at the other. Control handle 30 of valve 28 is connected by pivotable connector 32 to link 34, which in turn is connected by another pivotable connector 36 to the bottom of storage tank 18 near its resiliently supported end. When the resiliently supported end of storage tank 18 is displaced vertically downward a predetermined distance by a predetermined weight of purified water contained therein, link 34 moves correspondingly and rotates handle 30 of valve 28 to off position as shown in FIG. 1.

The strength of spring 24 is selected so that it will allow downward displacement of storage tank 18 to cause rotation of handle 30 of valve 28 to shut off flow of feed water therethrough when a predetermined weight of purified water is contained in storage tank 18. When water is withdrawn from storage tank 18, as by opening spigot 38, the weight of contained water in storage tank 18 is reduced and spring 24 raises the now lighter end of storage tank 18 and lifts link 34, which rotates handle 30 of valve 28 to open, or partly open, position and thus turns on introduction of feed water through pipe 26 and 26a into module 10. The means for actuating valve 28, namely the pivoted link 34, forms a mechanical linkage between the resiliently supported end of storage tank 18 and handle 30 of valve 28 to shut off or turn on introduction of feed water into module 10 at a predetermined vertical displacement of storage tank 18 caused by the weight of purified water therein.

Figure 2:
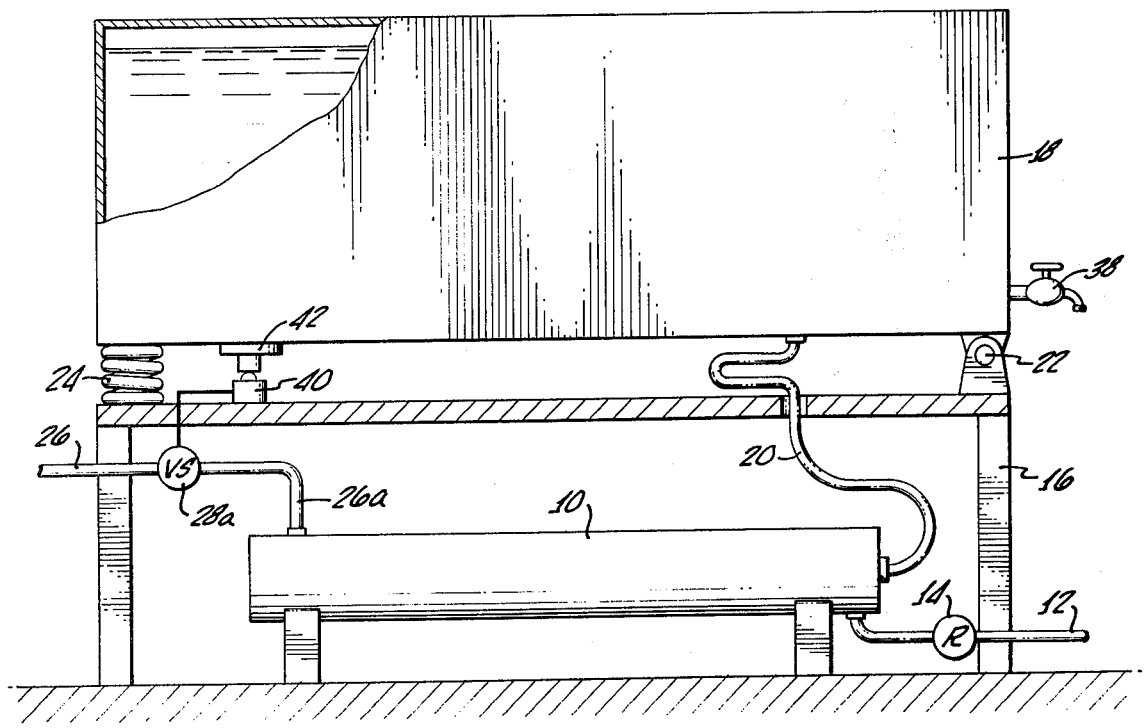
FIG. 2 is a diagrammatic illustration of a modified form of the system of FIG. 1, in which an electrically controlled valve is employed.

In FIG. 2 is shown a modification of the system illustrated in FIG. 1 and comprises the module 10 with brine release pipe 12 and restrictor 14, the rack 16 supporting storage tank 18 on pivot 22 at one end and resilient means as spring 24 at the other end, with feed water introduced into module 10 by pipe 26 having a valve 28a, and purified water transferred from module 10 to storage tank 18 through pipe 20. In this embodiment the linkage between the resiliently supported end of the storage tank and the valve is electrical as well as mechanical, the valve 28a being of a commercial electrically actuated type, operated by a solenoid electrically connected to a micro switch 40. The bottom of storage tank 18, or a suitable finger 42 attached thereto, mechanically contacts micro switch 40 to close solenoid valve 28a and thereby shuts off introduction of feed water through pipe 26 and 26a to module 10 when the resiliently supported end of storage tank 18 is vertically displaced downwardly a predetermined distance by the weight of purified water in storage tank 18. When the resiliently supported end of storage tank 18 becomes lighter by reason of withdrawal of purified water from storage tank 18 through spigot 38 and is vertically displaced upwardly to release finger 42 from micro switch 40, valve 28a is opened to turn on introduction of feed water through pipes 26 and 26a into module 10. Electrical linkage is employed in this modification for actuation of the feed water valve instead of the mechanical linkage employed in the embodiment of FIG. 1.

In FIG. 3 is shown another modification of the system of FIG. 2, in which a solenoid valve responsive to the weight of water in the storage tank is placed in the pipe transferring purified water from the module to the storage tank. In this embodiment the system comprises module 12 with brine release pipe 12 and restrictor 14, the rack 16 supporting storage tank 18 on pivot 22 at one end and resilient means such as spring 24 at the other end, with feed water introduced into module 10 by pipe 26. Purified water is transferred to storage tank 18 through pipe 20 in which is placed solenoid valve 28a, which is operated by connection to micro switch 40. The bottom of storage tank 18 or a suitable finger 42 attached thereto contacts micro switch 40 to close solenoid valve 28a and thereby shuts off the transfer of purified water from module 10 through pipe 20 into storage tank 18 when the resiliently supported end of storage tank 18 is displaced downwardly a predetermined distance by the amount or weight of purified water in storage tank 18. When the resiliently supported end of storage tank 18 becomes lighter by reason of withdrawal of purified water through spigot 38, and is vertically displaced upwardly to release finger 42 from micro switch 40, valve 28a is opened to turn on transfer of purified water through pipe 20 from module 10 into storage tank 18. Electrical linkage is employed in this embodiment to actuate a control valve place in the purified water transfer line.

It will be seen in all the embodiments discribed that the means for actuating the valve that controls the feed water input to, or the purified water transfer from the module, dependent on the weight of purified water in the storage tank, is completely outside the storage tank itself. Therefore, no mechanisms such as floats, level arms, bearings, valves, etc., are located within the tank and which could fail mechanically, corrode, rust or otherwise cause an undesirable odor, taste or suspended particles in the purified water in the storage tank. This is an important advantage because reverse osmosis systems for purifying municipal water for home use are most often used basically for the reason that the water produced is of a very pure grade, at least equivalent to so-called "bottled water," containing a low content of dissolved salts and of substantially enhanced characteristics such as taste, odor and clarity.

It will be appreciated that to obtain actuation of the control valve at a predetermined weight of water in the storage tank, the spring supporting one end of the tank will be of selected resiliency or tension. Also, the mechanical linkage or electrical micro switch arrangement will be of a type with arm lengths or switch spacing or characteristics to produce the desired shut off and turn on action interdependent with the spring tension.

Generally, also when a volume of purified water is withdrawn from the storage tank, the weight is substantially reduced. The feed or purified water lines are thereby opened for tank refilling and this may take an appreciable time before the original predetermined amount is restored in the storage tank. Therefore, problems of rapid on and off, or "hunting," do not normally occur.

Placing the control valve in the pipe introducing feed water into the module has the advantage that when this valve shuts off, operation of the module is stopped and no feed water is used. Since operation of the module is stopped, production of purified water will shut down and flow through the pipe transferring purified water from the module to the storage tank is also effectively stopped. When the control valve is placed in the pipe transferring purified water from the module to the storage tank, somewhat more precise and immediate purified water control is obtained, but module operation is not shut down and feed water continues to flow through the module and out to drain.

I claim:

1. A reverse osmosis system comprising a module containing a semipermeable membrane, a pipe for introducing feed water under elevated pressure into said module, means for releasing brine from said module while retaining operating pressure therein, a rigid storage tank for temporarily storing purified water passed through the semipermeable membrane in said module, and a pipe for transferring purified water from said module into said storage tank; in which the improvement comprises:

a. a valve in one of said pipe introducing feed water under elevated pressure into said module, and said pipe for transferring purified water from said module into said rigid storage tank;
b. a resilient support for an end of said rigid storage tank; and,
c. a mechanical linkage between the resiliently supported end of said rigid storage tank which actuates said valve at a predetermined vertical displacement of said resiliently supported end of said rigid storage tank caused by the weight of purified water therein.

2. A reverse osmosis system according to claim 1 in which a mechanical and electrical linkage between the resiliently supported end of said rigid storage tank and said valve actuates said valve, said electrical linkage comprising a solenoid operated valve and a switch, connected to said solenoid operated valve, which is mechanically actuated to shut off and turn on said solenoid operated valve by a predetermined vertical displacement of said resiliently supported end of said rigid storage tank caused by the weight of purified water therein.

* * * * *